United States Patent
Schofield, III et al.

(10) Patent No.: US 10,036,800 B2
(45) Date of Patent: Jul. 31, 2018

(54) SYSTEMS AND METHODS FOR USING COHERENT NOISE FILTERING

(71) Applicant: The United States of America as represented by the Secretary of the Navy, Washington, DC (US)

(72) Inventors: John Paul Schofield, III, Odon, IN (US); Jack Eugene Fulton, Jr., Elnora, IN (US); Terry Wayne Lockridge, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 340 days.

(21) Appl. No.: 14/819,813

(22) Filed: Aug. 6, 2015

(65) Prior Publication Data

US 2016/0041256 A1    Feb. 11, 2016

Related U.S. Application Data

(60) Provisional application No. 62/035,000, filed on Aug. 8, 2014.

(51) Int. Cl.
| | |
|---|---|
| *G01S 7/02* | (2006.01) |
| *G01S 13/93* | (2006.01) |
| *G01S 7/292* | (2006.01) |
| *G01S 13/52* | (2006.01) |
| *G01S 13/28* | (2006.01) |

(52) U.S. Cl.
CPC ............ *G01S 7/023* (2013.01); *G01S 13/931* (2013.01); *G01S 7/292* (2013.01); *G01S 13/282* (2013.01); *G01S 13/288* (2013.01); *G01S 13/52* (2013.01); *G01S 2013/9342* (2013.01); *G01S 2013/9346* (2013.01)

(58) Field of Classification Search
CPC .......... G01S 7/288; G01S 7/292; G01S 13/52; G01S 13/524; G01S 13/5244; G01S 13/5246; G01S 13/5248; G01S 13/526; G01S 13/53; G01S 13/534; G01S 13/931
See application file for complete search history.

(56) References Cited

U.S. PATENT DOCUMENTS

| | | | |
|---|---|---|---|
| 4,901,082 A | | 2/1990 | Schreiber et al. |
| 5,008,678 A | * | 4/1991 | Herman ................ G01S 7/032 342/158 |
| 5,790,067 A | * | 8/1998 | Van Ommeren ......... G01S 7/36 342/102 |

(Continued)

*Primary Examiner* — Peter M Bythrow
(74) *Attorney, Agent, or Firm* — Christopher A. Monsey

(57) ABSTRACT

Systems and methods are provided for the filtering of coherent noise signals. In an illustrative embodiment, a pulsed electronic signal receives varying phase shifts for each of its pulses prior to transmission. When coherent noise interferes with the transmitted signal, received signal receives a phase shift opposite of that applied prior to transmission such that the electronic signal is restored and the coherent noise becomes non-coherent. In another embodiment, width of each transmitted pulses can be varied prior to transmission, but a constant midpoint-to-midpoint time is maintained. After receiving a signal with coherent noise interference, the midpoints of the pulses are aligned causing the coherent noise to become non-coherent.

49 Claims, 11 Drawing Sheets

(56) References Cited

U.S. PATENT DOCUMENTS

| | | | | |
|---|---|---|---|---|
| 6,121,917 A * | 9/2000 | Yamada | ................ | G01S 13/345 342/104 |
| 6,531,976 B1 | 3/2003 | Yu | | |
| 9,372,259 B2 * | 6/2016 | Kishigami | ............ | G01S 7/2813 |
| 2003/0048214 A1 * | 3/2003 | Yu | ........................ | G01S 7/2813 342/16 |
| 2006/0262007 A1 * | 11/2006 | Bonthron | ................ | G01S 13/34 342/70 |
| 2007/0001897 A1 * | 1/2007 | Alland | ................... | G01S 7/288 342/70 |
| 2007/0222662 A1 * | 9/2007 | Toennesen | ............. | G01S 13/48 342/27 |
| 2008/0036645 A1 * | 2/2008 | Yamano | ................. | G01S 7/023 342/109 |
| 2009/0079617 A1 * | 3/2009 | Shirakawa | ............ | G01S 13/325 342/146 |
| 2009/0121918 A1 * | 5/2009 | Shirai | .................... | G01S 7/023 342/159 |
| 2012/0001791 A1 * | 1/2012 | Wintermantel | ......... | G01S 7/023 342/109 |
| 2013/0135140 A1 * | 5/2013 | Kishigami | ............. | G01S 7/282 342/189 |
| 2013/0176166 A1 * | 7/2013 | Kishigami | ............. | G01S 7/023 342/202 |
| 2014/0111367 A1 * | 4/2014 | Kishigami | ............ | G01S 7/2813 342/21 |
| 2015/0247924 A1 * | 9/2015 | Kishigami | ............ | G01S 13/931 342/70 |
| 2016/0238694 A1 * | 8/2016 | Kishigami | ............. | G01S 7/023 |

* cited by examiner

From Fig 3A

314

Repeat steps 302-312 for all pulses in a pulse train wherein, using e.g. the controller 210, each of the calculated phase shifts is different than each other's calculated phase shift such that each initial signal's pulse or wave form within a coherent dwell receives varying phase shifts to create the RPSRS 216 for transmission of each said pulse in the pulse train and thereby generating a plurality of said second signal processing outputs Using the signal processor 210, perform Doppler processing on the plurality of said second signal processing outputs, determining or generating detection data for contacts of interest based on the Doppler processing of the second plurality of signal processing outputs, providing the detection data to a vehicle control system, and generating a user interface showing the detection data or controlling one or more vehicle components based on the detection data

SYSTEMS AND METHODS FOR USING COHERENT NOISE FILTERING

CROSS-REFERENCE TO RELATED APPLICATIONS

The present application claims priority to U.S. Provisional Patent Application Ser. No. 62/035,000, filed Aug. 8, 2014, entitled "SYSTEM AND METHOD FOR COHERENT NOISE FILTERING," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 103,387) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to using systems and methods for filtering out coherent noise sources in detection systems. Detection systems can use directivity, frequency diversity, signal integration, and various signal processing techniques to overcome noise sources. Current techniques can to some extent be effective at filtering out random noise sources, but are vulnerable to false alarms caused by coherent noise sources. These vulnerabilities are further increased by an exponential increase in coherent noise sources. For example, collision avoidance systems must perform functions of collision warning, avoidance, and mitigation in a high coherent noise environment. Sources of coherent noise include, but are not limited to aviation radar systems, ship navigation radar systems, cell phones, and other collision avoidance radar systems. In this example, an operator or driver of a vehicle having an antenna or a communication system receiving such additional coherent noise could have the operator's antenna or communication system overwhelmed with interference, e.g., false indications of possible collisions. This undesirable condition could result in control systems malfunction, damage, or injury to the operator or driver. In some embodiments, the term coherent can refer to a comparative attribute of two sets of signals or wave phenomena such as how two sets of signals, one of which is noise, has a similar, identical, or substantially constant difference in attributes such as frequency, phase, or amplitude (e.g., two sets of coherent signals, one of which can be coherent noise, having the same or substantially the same phase or difference in phase) or how the two sets of signals are similar or synchronized in some way.

In an illustrative embodiment, a pulsed electronic signal receives varying phase shifts for each of its pulses prior to transmission. When coherent noise interferes with the transmitted signal, received signal receives a phase shift opposite of that applied prior to transmission such that the electronic signal is restored and the coherent noise becomes non-coherent. In another embodiment, width of each transmitted pulses can be varied prior to transmission, but a constant midpoint-to-midpoint time is maintained. After receiving a signal with coherent noise interference, the midpoints of the pulses are aligned causing the coherent noise to become non-coherent.

Another exemplary embodiment can have different systems, such as described or shown in FIG. 1, which generates phase shift sequences that are applied to outgoing emissions, e.g., radar or otherwise, so that emitters have a different phase shift sequence applied to their outgoing signals.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 3A and 3B show a flowchart of a method according to an illustrative embodiment of the invention;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
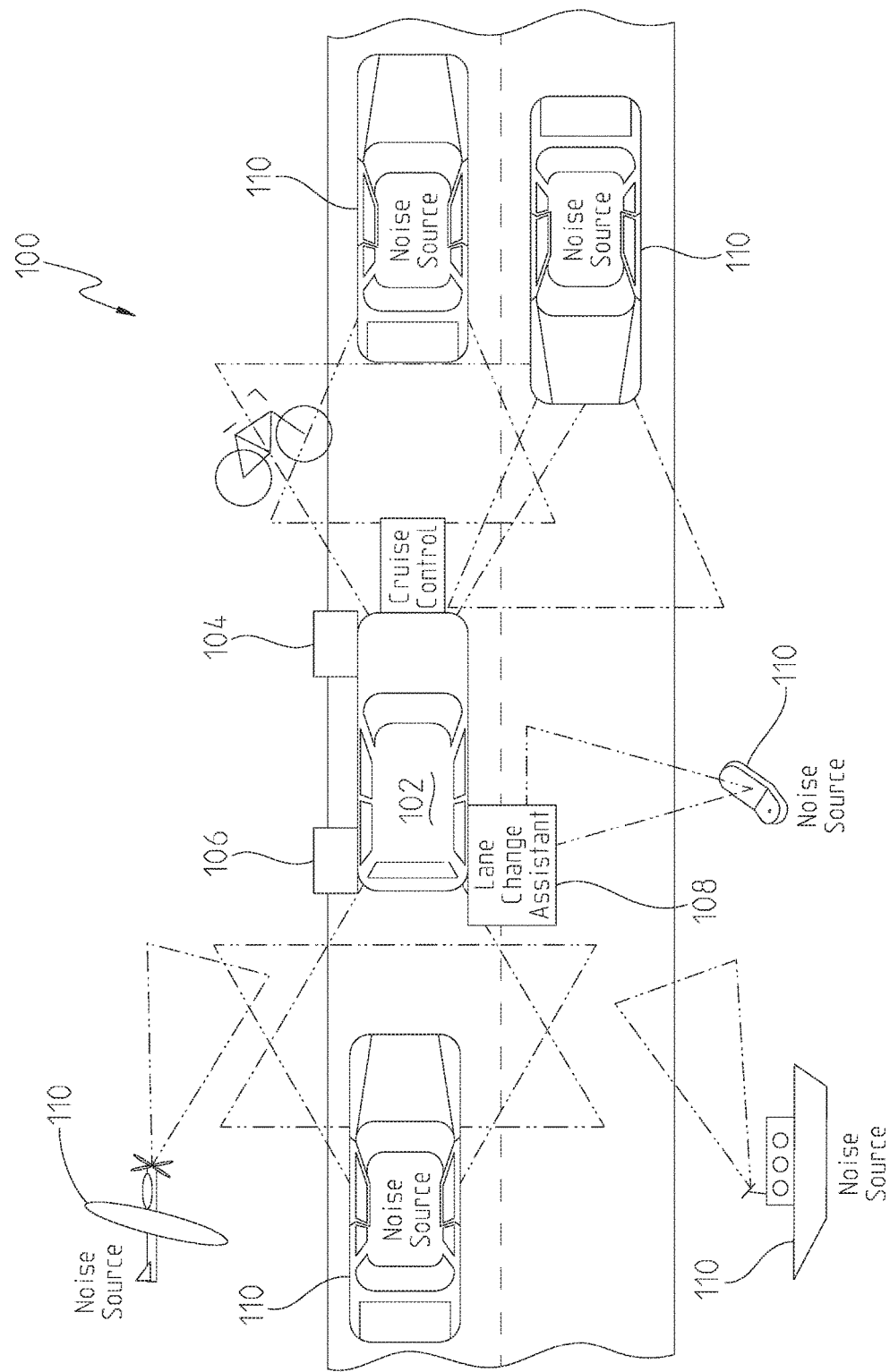
FIG. 1 shows an embodiment of the invention within a coherent noise environment according to an illustrative embodiment of the invention.

Referring initially to FIG. 1, an embodiment of the invention within a coherent noise environment 100 is shown. The coherent noise environment 100 includes a vehicle 102 with a front collision avoidance system 104, a rear collision avoidance system 106, and a lane change assistance system 108. The coherent noise environment 100 further includes a plurality of coherent noise sources 110, such as cellular phones or other vehicles with radar systems.

Exemplary front collision avoidance system 104, the rear collision avoidance system 106, and the lane change assistance system 108 use radar to detect nearby objects. However, it should be noted that the invention can be used with a system that includes wave based transmitter/receiver systems of which radar or radio frequency (RF) systems are but one embodiment or example. Coherent noise environment sources 110 produce coherent noise signals that interfere with radar systems 104, 106, and 108. Examples of coherent noise can be other vehicles or systems which use a similar transmitter and/or frequency that a system of interest which is being impacted by coherent noise uses. Thus, vehicle 102 includes, among other things, a filtering system (e.g. see FIGS. 2-7) that filters out coherent noise sources 110. An exemplary system of interest can use, e.g., a matched filter, which initially filters out non-coherent noise signals (to signal(s) of interest) received from an antenna (not shown in FIGS. 2-7) based on, e.g., a comparison or "matching" of a stored copy or variant of a signal of interest (e.g., transmitted wave form, electronic signal or signal of interest) but still leaves noise signals that are coherent with the signals of interest (e.g., electronic signal) sent out and received by the system of interest, such as radar signals emitted by the system of interest's transmitter antenna (e.g., see FIG. 2, 208). Noise that is coherent with the signals of interest must be filtered to ensure a system, such as a vehicle control system described herein, receives accurate information relative to signals of interest (e.g., reflected radar signals emitted by an antenna 208). To simplify discussion herein, some elements of a system using the invention will be omitted such as, e.g., the matched filter discussed above. However, it should be noted that one aspect of the invention focuses on filtering coherent noise from a stream of signals that the coherent noise is also within.

Figure 2:
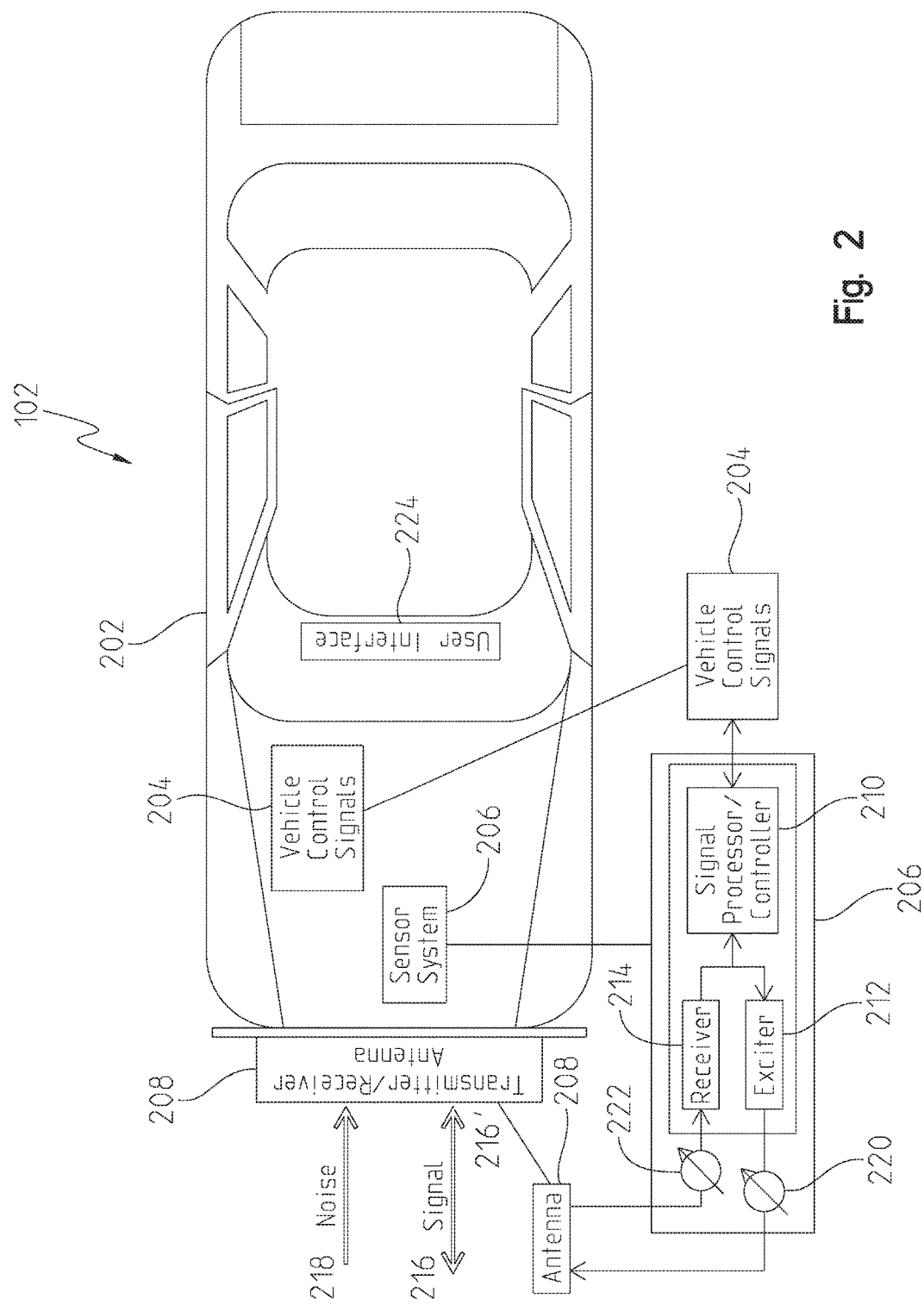
FIG. 2 shows a coherent noise filtering system according to an illustrative embodiment of the invention.

Referring to FIG. 2, a system (e.g., vehicle 102) that includes coherent noise filtering system in a platform, e.g., vehicle 102, according to an illustrative embodiment of the invention is shown. The exemplary coherent noise filtering system platform and system 102 includes a vehicle 202, a user interface 224, a vehicle control system 204, a sensor system 206, and an antenna 208. In the present embodiment, the sensor 206 can be coupled with an antenna for transmitting and receiving signals. Sensor 206 can include both a receiver 214 and an exciter 212 along with a system processor/controller 210. The exemplary exciter 212 develops a signal with a desired waveform which is passed to an exemplary transmitter (not shown but can be part of the sensor 206 or a separate component) where the transmitter then amplifies the desired waveform signal, among other things. The amplified waveform is eventually passed to the antenna 208 for transmission. Output or an element of modulation (e.g., phase shift or pulse width modulation) into or out of the exciter 212 can be stored in some embodiments for use in coherent noise filtering such as described herein. An exemplary user interface 224 can display results of processing in accordance with an embodiment of the invention including, e.g., functions associated with embodiments of sensor system 206 and antenna 208. Sensor system 206 can produce and receive radar signals. Sensor system 206 and antenna 208 can also receive coherent noise signals 218.

Vehicle control system 204 can be electronically connected to the controller 210 of sensor system 206. Controller 210 can be electronically connected to the exciter 212 and the receiver 214. Exemplary antenna 208 can be electronically connected to exciter 212 and receiver 214.

In one exemplary operation, the vehicle control system 204 communicates with the controller 210 of the sensor system 206 to initiate a vehicle control task, such as monitoring for front collision avoidance. The controller 210 communicates with the exciter 212 causing the exciter 212 to generate a pulsed or continuous wave (CW) radar signal. Prior to transmission of an output or transmitted signal, a calculated phase shift is applied to an initial signal (not shown) e.g., an initial radar signal with a first waveform, via, e.g., a phase shifter 220 (or a control input for a CW output; alternatively, the calculated phase shift can be applied by the exciter 212) to each pulse or CW output from the exciter 212 relative to the initial signal, e.g., initial radar signal. In this embodiment, the same calculated phase shift is not applied to every pulse or modulation of a CW aspect of the initial signal or initial radar signal (hereinafter initial signal). Rather, individual pulses of the initial signal receive varying or different calculated phase shifts such that a resulting phase shifted radar signal (RPSRS) 216, e.g., radar signal 216, are different or appears non-periodic (e.g., calculated phase shift is ten degrees for first pulse, twenty degrees for second, twenty five degrees for third, etc). Operation of phase shifter 220 can be performed or dictated by controller 210, and data representing the calculated phase shift (e.g., varying or different phase shifts) applied to each initial signal's pulse or CW segment of radar signal, can be stored in the controller 210 for use in coherent noise filtering. The RPSRS 216 can be transmitted by the antenna 208/sensor 206, bounces off nearby objects, and returns to the antenna 208/sensor 206.

The transmitted RPSRS 216, returns to the antenna 208/sensor 206 as a reflected RPSRS 216' along with coherent noise 218. Reflected RPSRS 216' and coherent noise 218 are electronically communicated to the receiver 214 where a complementary phase shift is applied (e.g., based on calculated phase shift) applied by phase shifter 220 that is used to modify or change a phase of the combined received reflected RPSRS 216' and coherent noise 218) (e.g., subtract stored calculated phase shift). For example, previously stored calculated phase shifts applied to sequences of each initial signal's or initial radar signal's pulses were ten degrees for the first pulse, twenty degrees the second twenty five degrees for the third, etc, then ten degrees were subtracted via an applied complementary phase shift from reflected RPSRS 216' of ten degrees for the first received pulse, twenty degrees for second received pulse, twenty five degrees from third received pulse, etc. The exemplary reverse phase shifter 222 phase shift input can be an opposite of original calculated phase shift input from phase shifter 220.

In other words, for one exemplary system, the controller 210 accesses the data representing the calculated phase shift applied to each initial signal's pulse (or CW segment) and interfaces with the receiver 214 to apply reverse phase shift (or complementary phase shift) via phase shifter 222. Since the exemplary calculated phase shift from phase shifter 220 applied varying phase shifts to each pulse (or CW segment) of the initial signal, the reverse phase shift by phase shifter 222 applies varying or different calculated phase shifts to the coherent noise 218 corresponding with each pulse of received reflected RPSRS 216'. Application or subtracting of the exemplary varying calculated phase shifts restore the reflected phase shifted signal or radar signal 216' to its original periodic form initially generated from exciter 212 (e.g., one or more elements or all of the initial signal's or initial radar signal's first waveform) and causes the coherent noise 218 to become non-coherent. The non-coherent noise is then filtered out accordingly, leaving only the desired, reflected radar signal.

For example, two vehicles with collision avoidance or navigation radar can be operating with one or more of the same equipment and same radar, same or similar waveforms, same frequency, etc. One or more of the radar systems can use an embodiment of the invention. One vehicle can apply calculated phase shifts to its generated initial signals or initial radar signals to create outbound signals (216) which are reflected off an object and returned as received reflected RPSRS 216'. Sources of coherent noise in this example can include direct emissions from the second vehicle as well as reflections of emissions from the second vehicle. Other sources can be other transmitters and corresponding reflections. Vehicle one receives reflected RPSRS 216' as well as emissions from vehicle two (as coherent noise). Coherent noise in various examples can include signals from vehicle two (or other sources) that are consistent (in or out of phase) with waveforms of RPSRS 216 generated over time from vehicle one. A waveform in various examples can include one or more frequency, phase, pulse, and/or amplitude modulations. Exemplary vehicle one controller 210 applies a complement of respective previously applied calculated phase shifts to each pulse in the received reflected RPSRS 216' to remove the calculated phase shifts from a sequence of pulses (e.g., defined by a dwell time) and then applies the matched filter to filter out all signals in the modified version of reflected RPSRS 216' that do not match the first waveforms of the initial signals or initial radar signals.

A pulse system can use a transmit/listen mode where it is recording signals that are returned in a specific time period. Dwell time can include a case where dwell time is a time period that pulses are transmitted in a group. In CW applications, a system can be designed to transmit and receive simultaneously. In a CW system an embodiment can include a system that includes a modulation that indicates a beginning and end of a sequence of signals of interest that phase shifting in accordance with one or more embodiments of the invention can be used within. In an alternative embodiment, phase shift from phase shifter 220 can be a pseudo-random phase shift. Data representing the phase shift amount of each pulse or CW segment of the radar signal can be generated by a random number generator (not shown) in the controller 210. The exemplary controller 210 interfaces with the exciter 212 to apply the pseudo-random phase shift by phase shifter 220 to outgoing radar signal 216. Data representing the initial phase shift amount of each pulse of the radar signal applied to output of the exciter by phase shifter 220 can be stored in the controller 210 such that the data can be used to apply a reverse phase shift via phase shifter 222 once the radar signal is received. A truly random choice is difficult. Thus, pseudo-random schemes can be used.

In some embodiments, there can be preferred calculated phase shifts. For example, there can be a random selection of discrete pre-selected preferred calculated phase shift values. Thus, a system can store a list of such preferred calculated phase shift values in a memory and then a random or pseudo-random selection system or element (software or hardware implemented) can select a sequence of randomly or pseudo randomly selected preferred calculated phase shift values for use with an embodiment of the invention such as described herein.

Figure 3A:
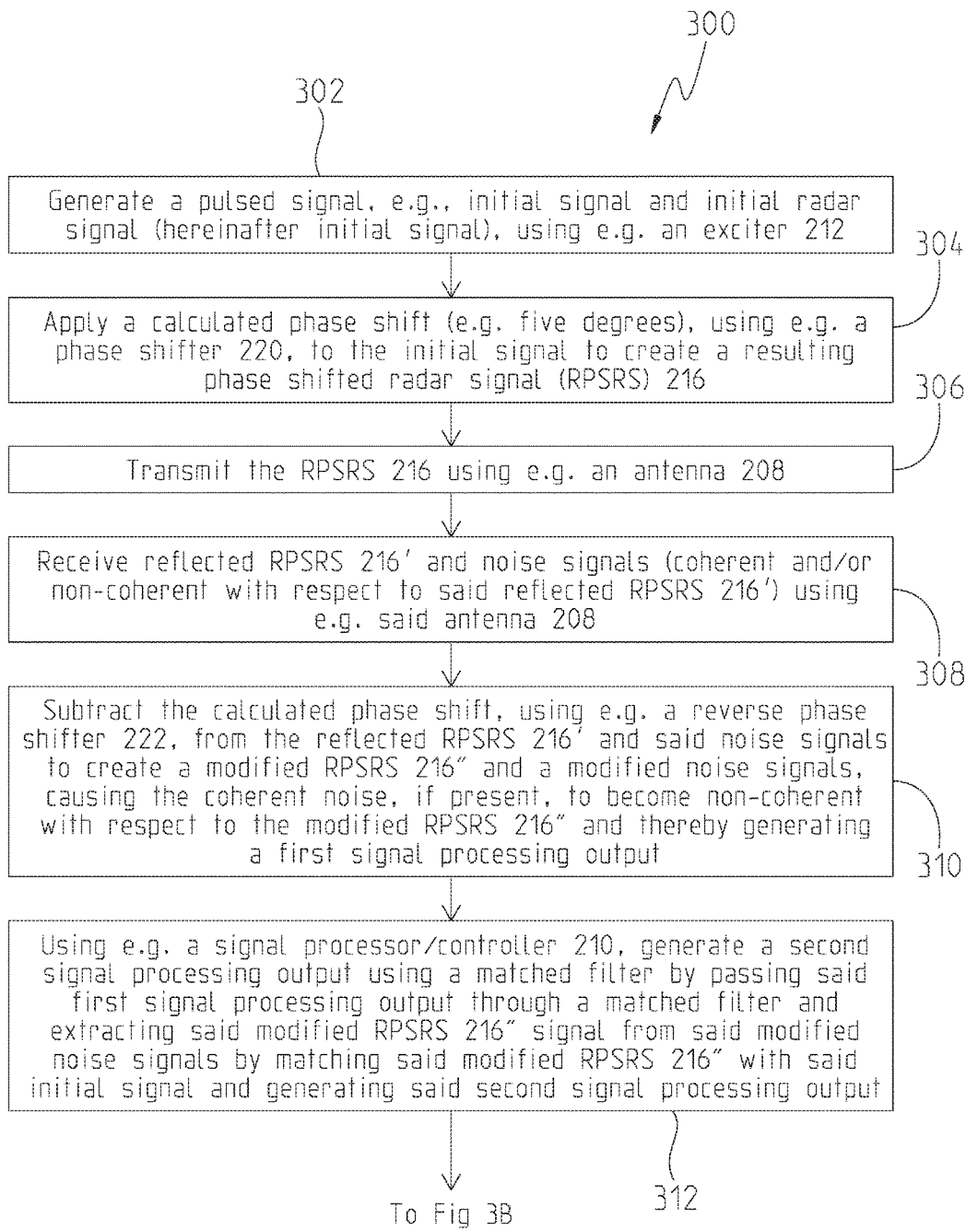

Referring to FIGS. 3A and 3B, a flowchart 300 of one exemplary method for filtering out coherent noise according to an illustrative embodiment of the invention is shown. At step 302, generate a pulsed signal, e.g., initial signal or initial radar signal (hereinafter initial signal), using an exciter (e.g., 212). At step 304, apply a calculated phase shift (e.g. five degrees) to the initial signal to create a resulting phase shifted radar signal (RPSRS) 216 (using e.g. a phase shifter 220). At step 306, transmit the RPSRS 216 using e.g. a, antenna 208. At step 308, receive reflected RPSRS 216' and noise signals (coherent and/or non-coherent with respect to the reflected RPSRS 216') using e.g. said antenna 208. At step 310, subtract the calculated phase shift (e.g., five degrees), using e.g. said phase shifter 222, from the reflected RPSRS 216' and said noise signals to create a modified RPSRS 216" and modified noise signals, causing the coherent noise, if present, to become non-coherent noise with respect to the modified RPSRS 216" and thereby generating a first signal processing output. At step 312, using e.g. a signal processor/controller 210, generate a second signal processing output using a matched filter by passing said first signal processing output through said matched filter and extracting said modified RPSRS 216" signal from said modified noise signals by matching said modified RPSRS 216" with said initial signal and generating said second signal processing output. At step 314, repeat steps 302-312 for all pulses in a pulse train wherein, using e.g. said controller 210, each of the calculated phase shifts is different than each other's calculated phase shift such that each initial signal's pulse or wave form within a coherent dwell (e.g., listening period) receives varying phase shifts to create the RPSRS 216 for transmission (e.g., add five degrees phase shift to a first pulse's waveform, next pulse waveform add ten degrees, next pulse waveform add thirty degrees, etc) of each said pulse in said pulse train and thereby generating a plurality of said second signal processing outputs. One example of filtering non-coherent noise, if present, can be using a matched filter to filter all signals in the plurality of first signal processing outputs that don't match a waveform of the waveform element(s) of the initial signals or initial radar signals. At step 316, using said signal processor 210, perform Doppler processing on the plurality of said second signal processing outputs, determining or generating detection data for contacts of interest based on the Doppler processing of the second plurality of signal processing outputs, providing the detection data to a vehicle control system, and generating a user interface showing the detection data or controlling one or more vehicle components based on the detection data.

In an alternative embodiment, the phase shift applied in step 304 is a pseudo-random phase shift applied to each pulse of the initial signal or initial radar signal as well as using the pseudo-random phase shifts in subsequent processing as described, e.g., above.

Figure 4:
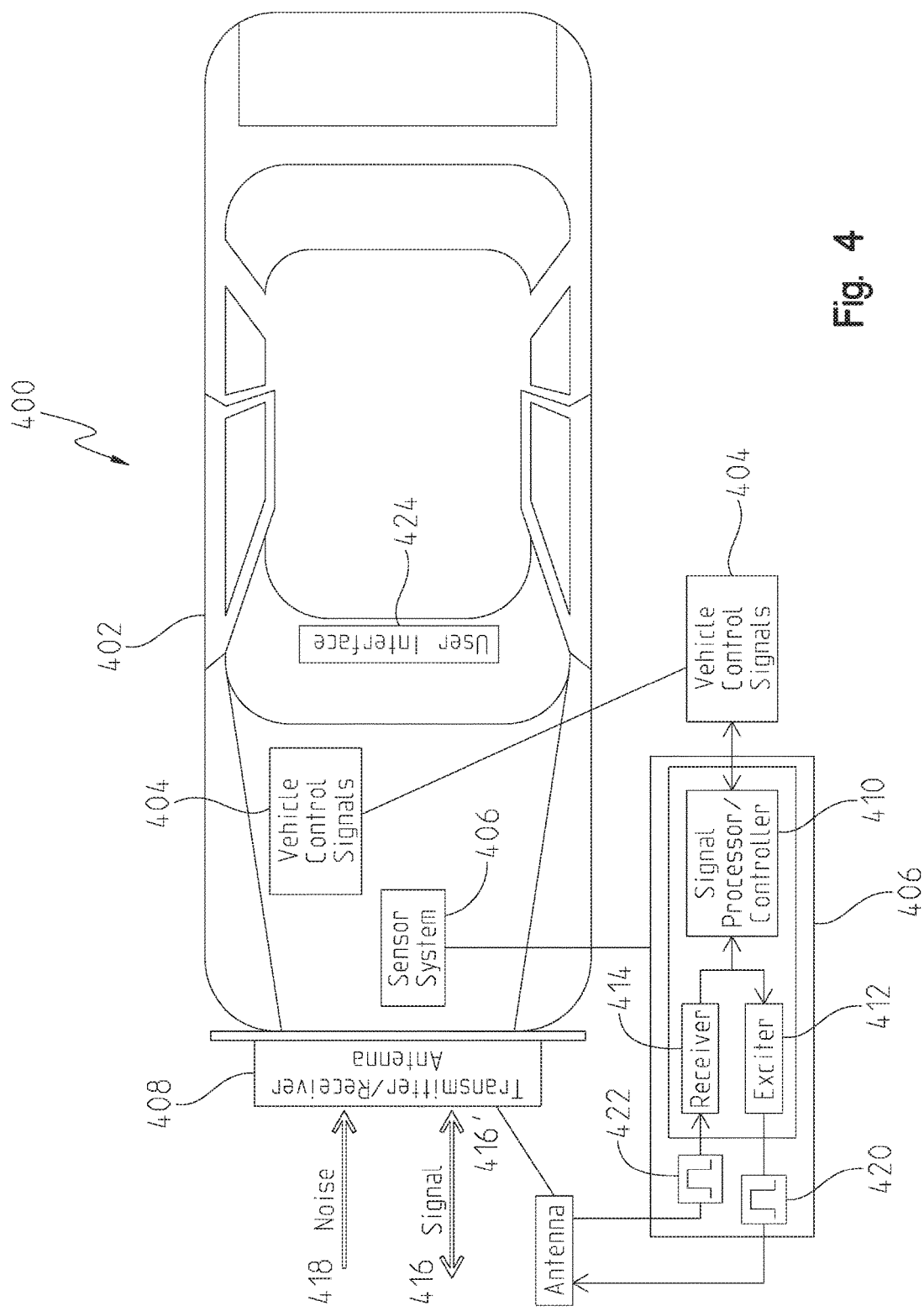
FIG. 4 shows a coherent noise filtering system according to another illustrative embodiment of the invention.

Referring to FIG. 4, one coherent noise filtering system 400 according to an illustrative embodiment of the invention is shown. The exemplary coherent noise filtering system 400 includes a vehicle 402, a user interface 424, a vehicle control system 404, a sensor system 406, and an antenna 408. In the present embodiment, the sensor 406 can be coupled with an antenna for transmitting and receiving signals. Sensor system 406 can include both an exciter 412 and a receiver 414 along with a system processor/controller 410. An exemplary user interface 424 can display results of processing in accordance with an embodiment of the invention including, e.g., functions associated with embodiments of sensor system 406 and antenna 408. The exemplary sensor system 406 can produce and receive a radar signal 416. Sensor system 406 and antenna 408 can also receive coherent noise signals 418.

The exemplary vehicle control system 404 is electronically connected to the controller 410 of the sensor system 406. Controller 410 is electronically connected to the exciter 412 and the receiver 414. The exemplary sensor 408 can be electronically connected to the exciter 412 and the receiver 414. A user interface 424 displays outputs from processing by the aspects of the invention.

In one exemplary operation, one example of vehicle control system 404 communicates with the controller 410 of the sensor system 406 to initiate a vehicle control task, such as monitoring for front collision avoidance. Controller 410 communicates with the exciter 412 causing the exciter 412 to generate a pulsed or CW radar signal. Prior to transmission of an output or transmitted signal, a predetermined pulse width modulation 420 is applied to each pulse of the first signal (not shown) e.g., first radar signal with an initial waveform, via, the exciter 412. The pulse width modulation varies the width of each of the pulses of the radar signal such that the midpoint to midpoint time between pulses is constant but the leading edge to leading edge time between pulses is not constant. Thus, the modulated radar signal appears to have a jitter effect. The resulting pulse width modulated radar signal 416 (hereinafter RPWM signal), e.g., radar signal is transmitted by the antenna 408/sensor 406, bounces off nearby objects, and returns to the antenna 408/sensor 408. Again, note that an alternate embodiment of the invention can use CW systems versus pulse systems.

The RPWM signal 416 returns to the antenna 408/sensor 406 as a received, reflected RPWM signal 416' along with coherent noise 418. The transmitted PWM signal can include a number of signals including radar signals. Received, reflected RPWM 416' and coherent noise 418 are electronically communicated to the receiver 414 where a midpoint alignment 422 is applied, causing the jitter effect to disappear. Aligning the returns for each pulse to the midpoint of a specific pulse realigns the returns for multiple pulses resulting in coherent data between the different pulse returns. Coherent processing of the realigned data will detect real targets while returns of coherent noise are integrated into the noise floor. This embodiment essentially adds a semi-random time delay to the coherent noise source which effectively adds a random phase to the coherent noise source, causing the coherent noise source to become non-coherent. The non-coherent noise is then filtered out, leaving only the desired, reflected radar signal.

In an alternative embodiment, the predetermined pulse width modulation 420 applied to each pulse of the radar signal can be a pseudo-random modulation such that the width of each pulse varies randomly. In this embodiment, the midpoint to midpoint time between pulses should remain generally constant. The controller 410 communicates with the exciter 412 to apply the pseudo-random modulation by exciter 412 to the initial signal. Data representing the pulse width modulation amount of each pulse or CW segment of the radar signal can be generated by a random number generator (not shown) in the controller 410. Also, data representing the pulse width modulation applied to each initial signal can be stored in the controller 410 such that the data can be used to realign the midpoints of the RPWM 416'. A truly random choice is difficult. Thus, pseudo-random schemes can be used. In some embodiments, there can be preferred calculated phase shifts. For example, there can be a random selection of discrete pre-selected, preferred, and calculated pulse width modulation values. Thus, a system can store a list of such preferred, calculated pulse width modulation values in a memory and then a random or pseudo-random selection system or element (software or hardware implemented) can select a sequence of randomly or pseudo randomly selected preferred, calculated pulse width modulation values for use with an embodiment of the invention such as described herein.

Figure 5A:
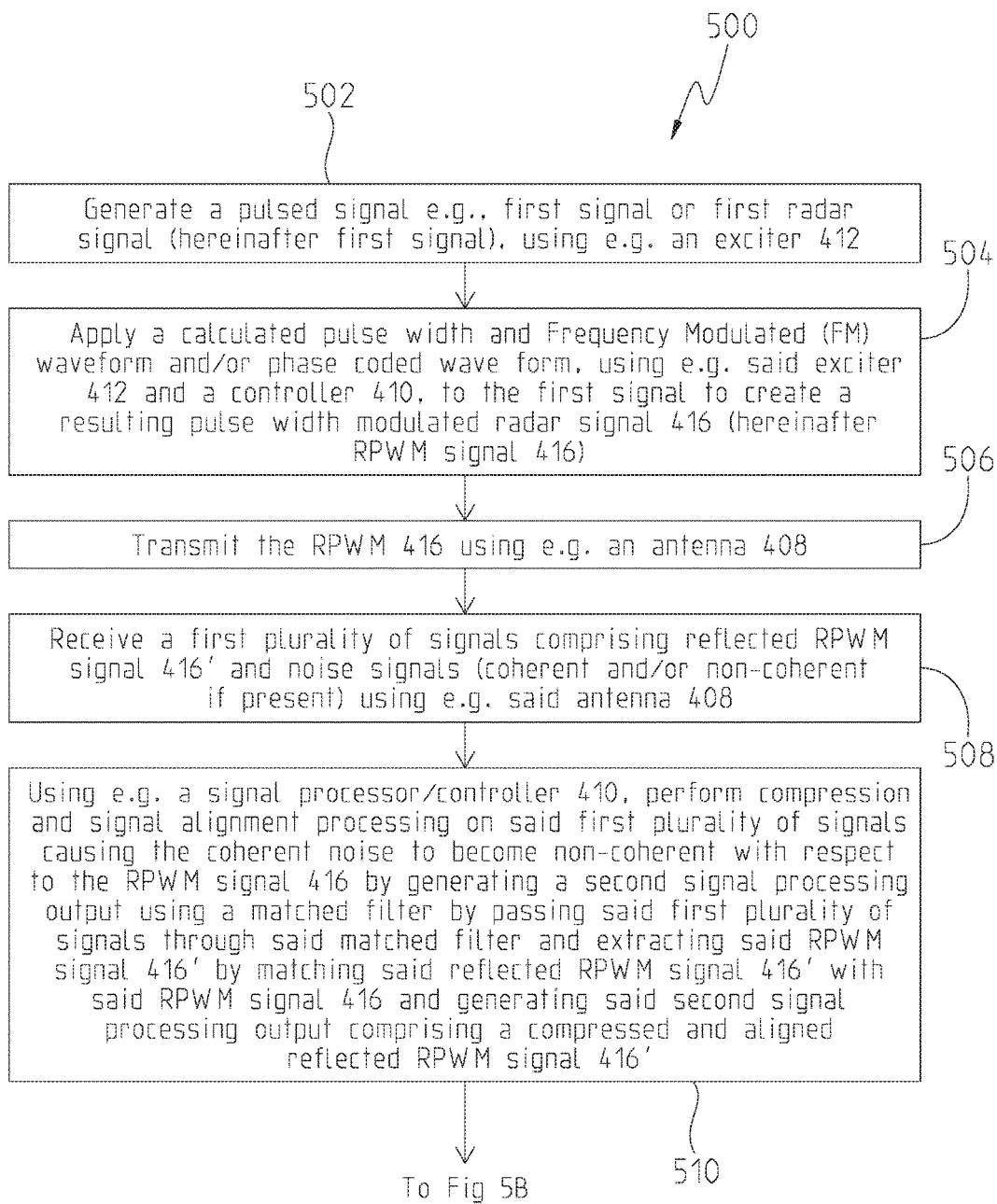
FIGS. 5A and 5B show a flowchart of a method according to another illustrative embodiment of the invention.
Figure 5B:
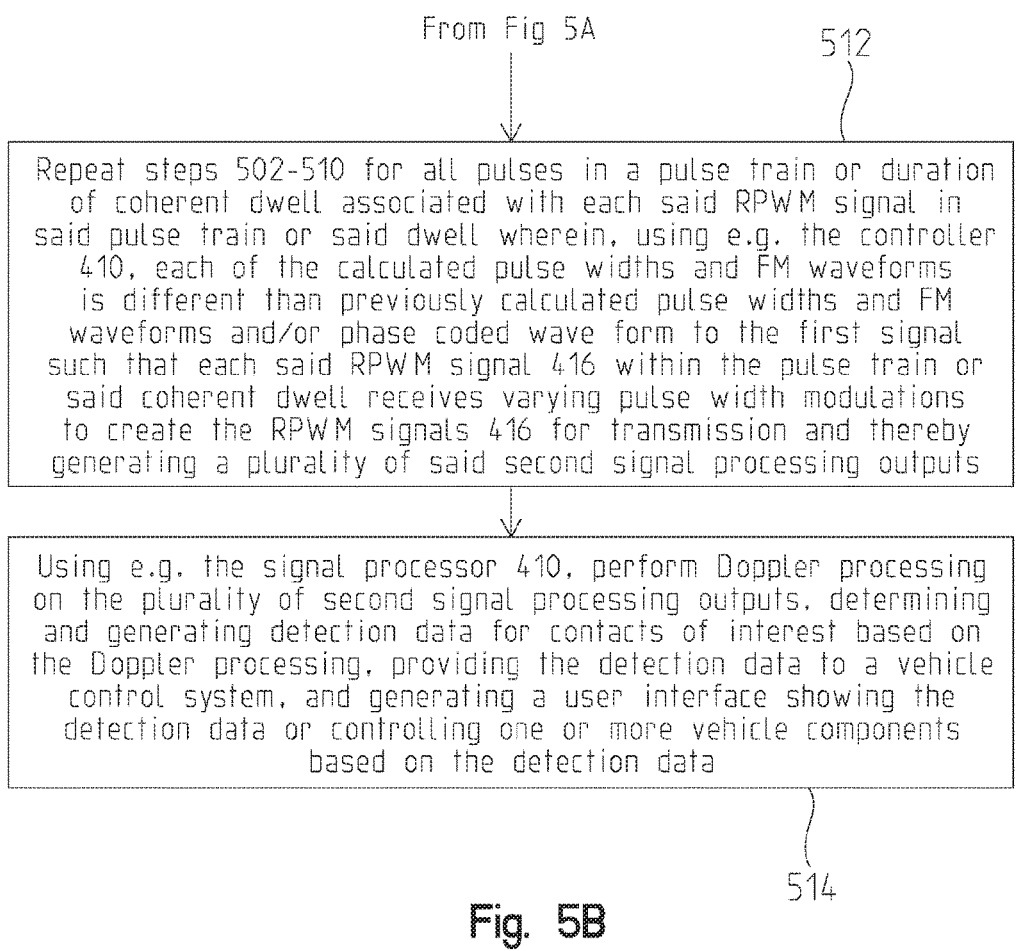

Referring to FIGS. 5A and 5B, a flowchart 500 of a method for filtering out coherent noise according to an illustrative embodiment of the invention is shown. At step 502, generate a pulsed signal, e.g., first signal or first radar signal (hereinafter first signal), using e.g. an exciter 412. At step 504, apply a calculated pulse width (e.g. 32 μs) and Frequency Modulated (FM) Waveform (e.g., 10 MHz Linear FM), using e.g. said exciter 412 and a controller 410, to the first signal to create a RPWM signal 416. At step 506, transmit RPWM signal 416 using e.g. an antenna 408. At step 508, receive reflected radar signals including reflected RPWM signals 416' and noise signals (coherent and/or non-coherent) using said antenna 408. At step 510, using e.g. a signal processor/controller 410, perform compression and signal alignment processing on said first plurality of signals causing the coherent noise to become non-coherent with the RPWM signal 416 by generating a second signal processing output using a matched filter by passing said first plurality of signals through said matched filter and extracting said reflected RPWM signal 416' by matching said reflected RPWM signal 416' with said RPWM signal 416 and generating said second signal processing output comprising a compressed and aligned reflected RPWM signal 416'. At step 512, repeat steps 502-510 for all pulses in a pulse train or duration of coherent dwell associated with each said RPWM signal 416 in said pulse train or said dwell wherein, using said controller 410, each of the calculated pulse widths and FM waveforms is different than previously calculated pulse widths and FM waveforms and/or phase coded wave form to the first signal such that each said RPWM signal 416 within the pulse train or said coherent dwell (e.g., listening period) receives varying pulse width modulations to create the RPWM signals 416 for transmission (e.g., 32 μs pulse width and 10 MHz Linear FM Waveform for the first pulse wave form, next pulse waveform use a 64 μs pulse width and 20 MHz Linear FM Waveform, next pulse waveform use a 16 μs pulse width and 5 MHz Linear FM Waveform, etc) and thereby generating a plurality of second signal processing outputs. At step 514, using e.g. signal processor 410, perform Doppler processing on the plurality of second signal processing outputs, determining and generating detection data for contacts of interest based on the Doppler processing, providing the detection data to a vehicle control system, and generating a user interface showing the detection data or controlling one or more vehicle components based on the detection data. In an alternative embodiment, the pulse width modulation applied in step 504 is a pseudo-random pulse width modulation applied to each pulse of the first signal or first radar signal as well as using the pseudo-random phase shifts in subsequent processing as described, e.g. above.

Another embodiment can include a step where a radar signal is generated. Next, a predetermined pulse width modulation is applied to the radar signal. The pulses receive varying pulse width modulations such that the leading edge-to-leading edge time between pulses is staggered while the midpoint-to-midpoint time between pulses remains constant. Next, the modulated radar signal is transmitted and the modulated radar signal is received along with coherent noise. Next, the midpoints of the received pulses are aligned. This alignment effectively phase shifts the coherent noise source in an amount corresponding to the staggered time between the leading edges of the radar pulses, causing the coherent noise source to become non-coherent. Finally, the non-coherent noise is filtered out, leaving only the desired, reflected radar signal.

Figure 6:
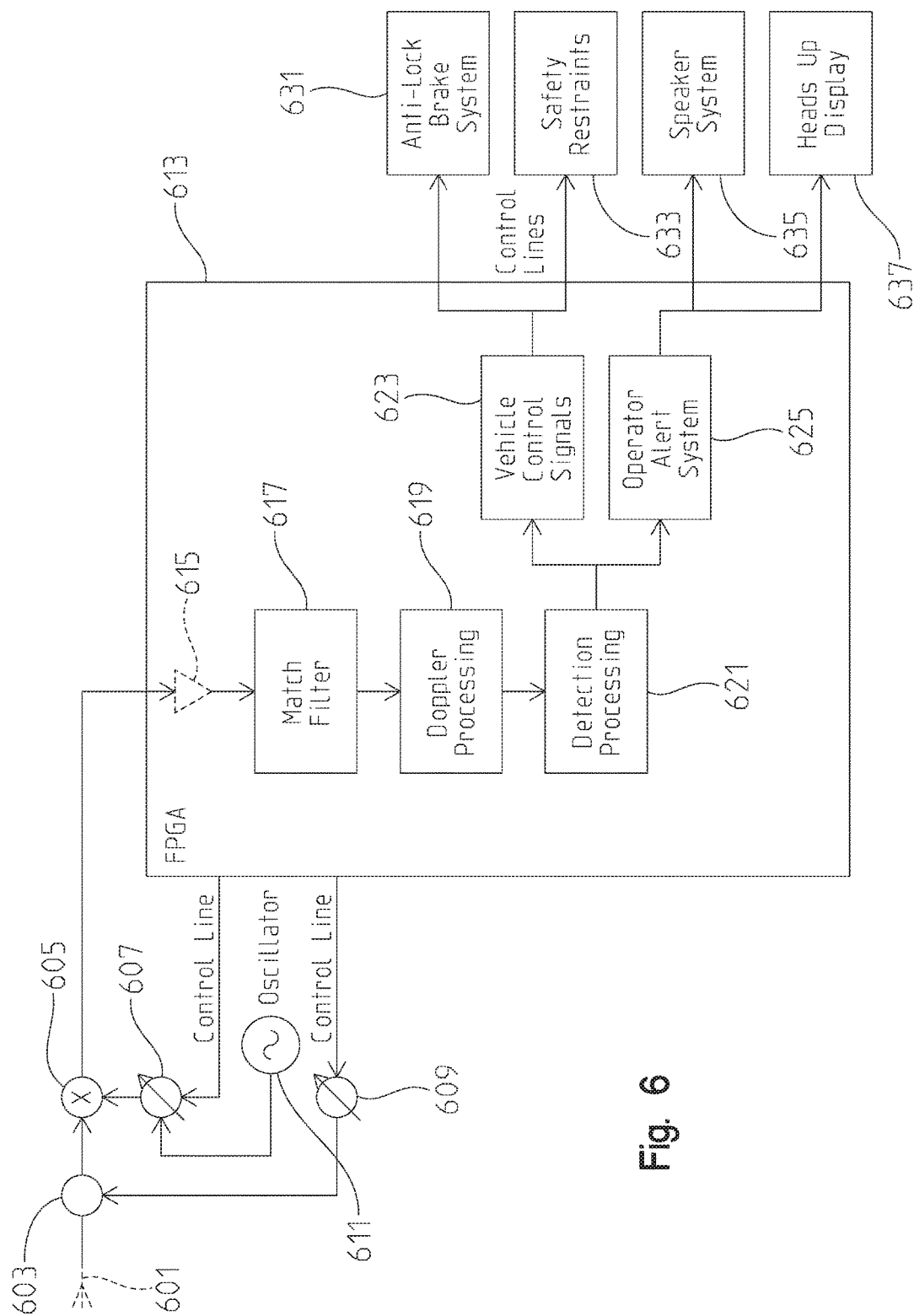
FIG. 6 shows a hardware architecture for implementing one exemplary embodiment of the invention.

Referring to FIG. 6, a simplified block diagram of another exemplary embodiment of the invention is shown which uses a field programmable gate array (FPGA) 613. In this example, FPGA 613 includes programmable logic blocks that are selected/activated by hardware design language (HDL) (not shown) to have functions described herein to include functions described in, e.g., FIG. 3 or 5. The FIG. 6 embodiment is simplified to focus more on processing associated with receipt of reflected RF signals which are then used to generate inputs for vehicle control and/or operator alert systems rather than generation of transmitter output signals in accordance with embodiments of the invention such as shown in, e.g., FIG. 3. An alternative embodiment can also incorporate a general processor, a machine instruction storage media (e.g. hard drive), and machine readable instructions (software) stored on the storage media implementation can also be used which implements processes, methods or functions such as described herein. In this case, the FPGA 613 can be programmed to generate, e.g., control signals used to modulate or generate radar signal pulses or CW segments using systems such as, e.g., described herein (e.g., via a RF signal generator or exciter not shown in FIG. 6); e.g., see FIG. 2. In this example or embodiment, these control signals are then output from the FPGA 613 into a first phase shifter 609 where a plurality of first phase shifts comprising sequences of different or varying phase shifts are applied to an RF or radar signal's pulses or CW segments to generate a first plurality of wave shifted outputs (e.g., such as described in FIG. 3 or 5). The first plurality of wave shifts are stored as a first plurality wave shift data in, e.g., FPGA 613. FPGA 613 can also generate control signals to apply other types of phase shifts for controlling output from for a transmitter or exciter such as described herein or used with other embodiments of the invention. The first plurality of wave shifted outputs can then passed to circulator 603 and then output by antenna 601 as a first plurality of electromagnetic signals which pass into a signal environment that can include objects which reflect the first electromagnetic signals and noise signals (such as show in FIG. 1). Antenna 601 then receives a second plurality of electromagnetic signals that includes a first plurality of noise signals and a first plurality of wave shifted reflected signals formed from reflections of the first plurality of electromagnetic signals that have been reflected off objects towards the antenna 601. The first plurality of electromagnetic signals is then received and passed from the antenna 601 to a frequency mixer 605 (e.g., an electrical circuit that creates new frequencies from two signals applied to it). Mixer 605 receives inputs from a second phase shifter 607 that are generated based on the first plurality of phase shift data from the FPGA 613 to subtract at least some of the first plurality of wave shifts from the first plurality of wave shifted reflected signals and the first plurality of noise signals. In other words, FPGA 613 is configured to control the oscillator 611, second phase shifter 607, and mixer 605 to subtract the first plurality of wave shifts from the second plurality of electromagnetic signals based on the stored first plurality of phase shift data to generate a first plurality of phase subtracted signals. The first plurality of phase subtracted signals output from the mixer 605 based on inputs from the second phase shifter 607 comprise a first plurality of target signals derived from the first plurality of wave shifted reflected signals and a second plurality of noise signals derived from the first plurality of noise signals which are no longer substantially or identically coherent with the first plurality of target signals. The first plurality of phase subtracted signals are output by the mixer 605 into the FPGA 613 where they are received by an Analog-to-Digital (A/D) Converter Section 615 which then outputs digital data representations of the first plurality of phase subtracted signals to a Match Filter Section 617. The Match Filter 617 output is sent to a Doppler Processing Section 619 which in turn outputs data to a Detection Procession Section 621. The Detection Processing Section 621 then outputs detection data to a Vehicle Control Signals Section 623 and/or an Operator Alert System Section 625. The Vehicle Control Signals section 623 outputs control data to vehicle systems such as, e.g., an Anti-Lock Brake System 631 or a Safety Restraints System 633. The Operator Alert System 625 outputs to, e.g., System Speaker 635 (e.g., audio warnings or instructions) and/or a user interface such as, e.g., a Heads-Up Display 637.

Figure 7:
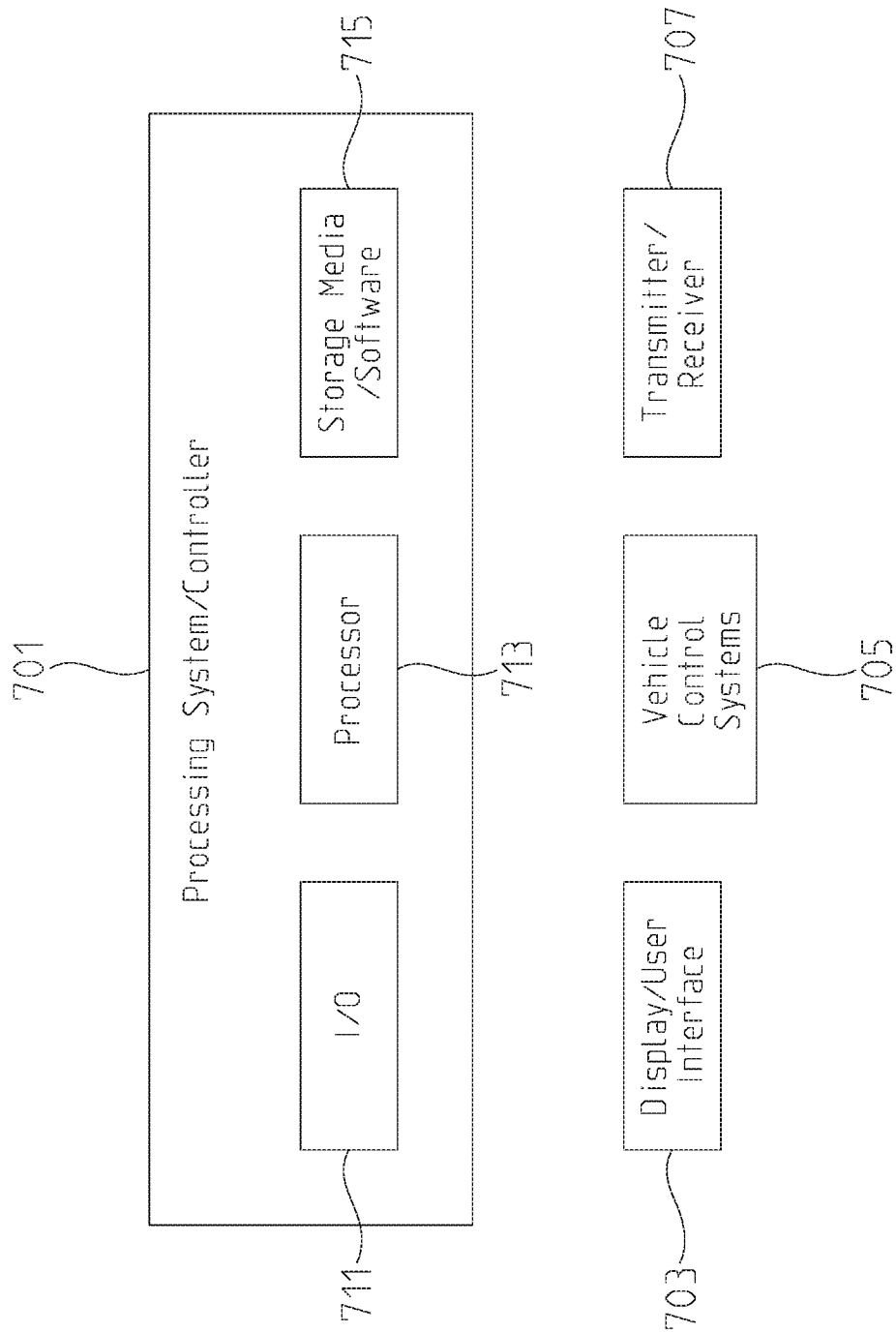
FIG. 7 shows a software system on storage media and processor/controller implemented architecture operated at least in part by the software for implementing one exemplary embodiment of the invention.

FIG. 7 shows a software on storage media and processor/controller implemented architecture for implementing one exemplary embodiment of the invention. A processing system 701 can include an input/output (I/O) section 711, a processor 713, and a storage media containing software or machine readable instructions implementing processing such as described herein (e.g., above in FIGS. 3A and 3B). The processing system/controller 701 can control elements of an embodiment of the invention to include display/user interface 703, vehicle control systems 705, and/or transmitter/receiver 707. Software functions can be directed to a first processing sequence operable to modulate a pulsed electronic signal sequence by mixing a series of varying phase shifts for each of its pulses prior to transmission to produce a transmitted signal. A second processing sequence can be provided operable to engage filtering of coherent noise contained in received signals that interferes with detection of the transmitted signal so that the received signal (that contains noise that is coherent with a reflection of the transmitted signal) is mixed with a subtraction of the varying phase shifts applied prior to the transmitted signal. Accordingly, the electronic signal is restored to aspects of its state (e.g. phase) prior to application of the varying phase shifts and the coherent noise becomes non-coherent. A third processing sequence can then filter the now-non-coherent noise from the received signal and used in further processing such as use in a vehicle control system or an object detection or user alert system.

In another embodiment, the width of each of the pulses is varied prior to transmission, but a constant midpoint-to-midpoint time is maintained. After receiving the signal with coherent noise interference, the midpoints of the pulses are aligned causing the coherent noise to become non-coherent.

In an alternative embodiment, any of the above embodiments of the present invention are not limited to use with radar signals, but may also be used with acoustical, radio frequency, and infrared marine, airborne, and land-based ranging and detection systems.

Another exemplary embodiment can have different systems, such as described or shown in FIG. 1, which communicate phase shift sequences with each other that they will apply to outgoing emissions, e.g., radar or otherwise, so that each of their emitters have a different phase shift sequence applied to their outgoing signals. Such sequences can be stored in a library so that a phase shift sequence identifier can be used for communicating with each of the different sources of wave emissions such as, e.g., 102 and different types of noise sources to a system of interest (e.g., the various types of noise sources 111 shown in FIG. 1). The phase shift identifier for each set of phase shift sequence (e.g., five degrees, ten degrees, fifteen degrees, twenty degrees, etc) can be either stored in a library or the actual sequence can be communicated such as, for example, a starting phase shift value (e.g., five degrees), an increment sequence value (e.g., increment the starting phase shift value by ten degrees so a first increment would be (in this example) twenty degrees, and how many times the sequences should be incremented using the increment (e.g., increment ten times) which corresponds to a number of pulses or segments of a CW the phase shifts are to be applied to. In this way, various systems can ensure their phase shift based filtering approach does not apply the same phase shifts to their outgoing and incoming emissions than another system does. This system can also use this phase shift communication scheme to identify other entities which are active objects that may require particular actions such as vehicle control or user alerts. For example, an object which is emitting noise to a receiver system that been filtered out can be correlated with target information so that particular user interface alerts can be based on correlation of validated target information (based on decluttered radar return target detection signals) and communicated phase shift scheme information. An additional identifier can be added such as category of emitting object (e.g., school bus, emergency vehicle, or identifiers indicating another object of concern is in proximity to the transmitting object (such as a police vehicle transmitting they are in pursue of a criminal in a high speed chase)).

Figure 8:
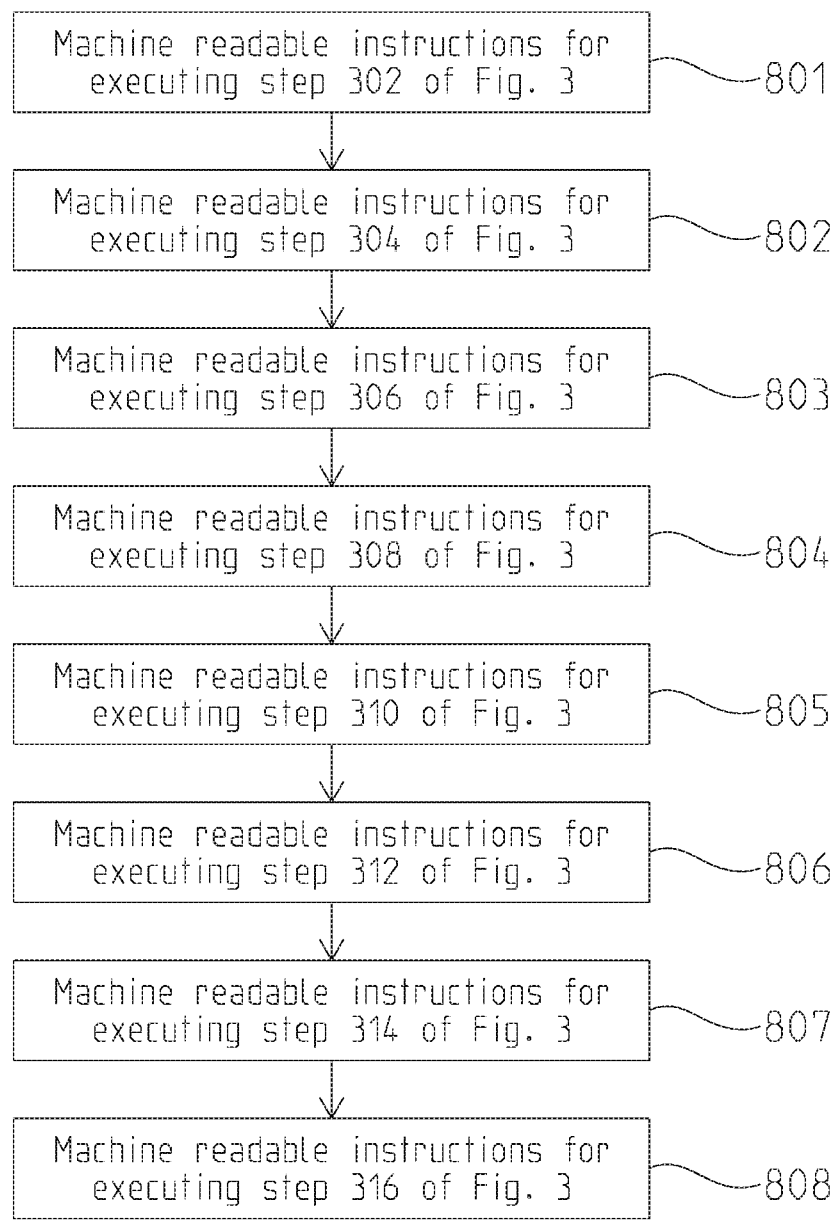
FIG. 8 shows a flowchart of a method according to another illustrative embodiment of the invention.

Referring to FIG. 8, a simplified block diagram showing code or subroutine blocks for executing an embodiment of the invention and operating various hardware elements (e.g., see FIGS. 2, 4, 6, and 7) that are stored on a recording medium (e.g., see FIG. 7, 715) storing a plurality of non-transitory machine readable instructions adapted for being read by and controlling a system comprising in accordance with an embodiment of the invention (e.g., see FIGS. 2, 4, 6, and 7), said instructions comprising: a first plurality of non-transitory machine readable instructions module 801 adapted for executing step 302 of FIGS. 3A and 3B, a second plurality of non-transitory machine readable instructions module 802 adapted for executing step 304 of FIGS. 3A and 3B, a third plurality of non-transitory machine readable instructions module 803 adapted for executing step 306 of FIGS. 3A and 3B, a fourth plurality of non-transitory machine readable instructions module 804 adapted for executing step 308 of FIGS. 3A and 3B, a fifth plurality of non-transitory machine readable instructions module 805 adapted for executing step 310 of FIGS. 3A and 3B, a sixth plurality of non-transitory machine readable instructions module 806 adapted for executing step 312 of FIGS. 3A and 3B, a seventh plurality of non-transitory machine readable instructions module 807 adapted for executing step 314 of FIGS. 3A and 3B, and an eighth plurality of non-transitory machine readable instructions module 808 adapted for executing step 316 of FIGS. 3A and 3B.

Figure 9:
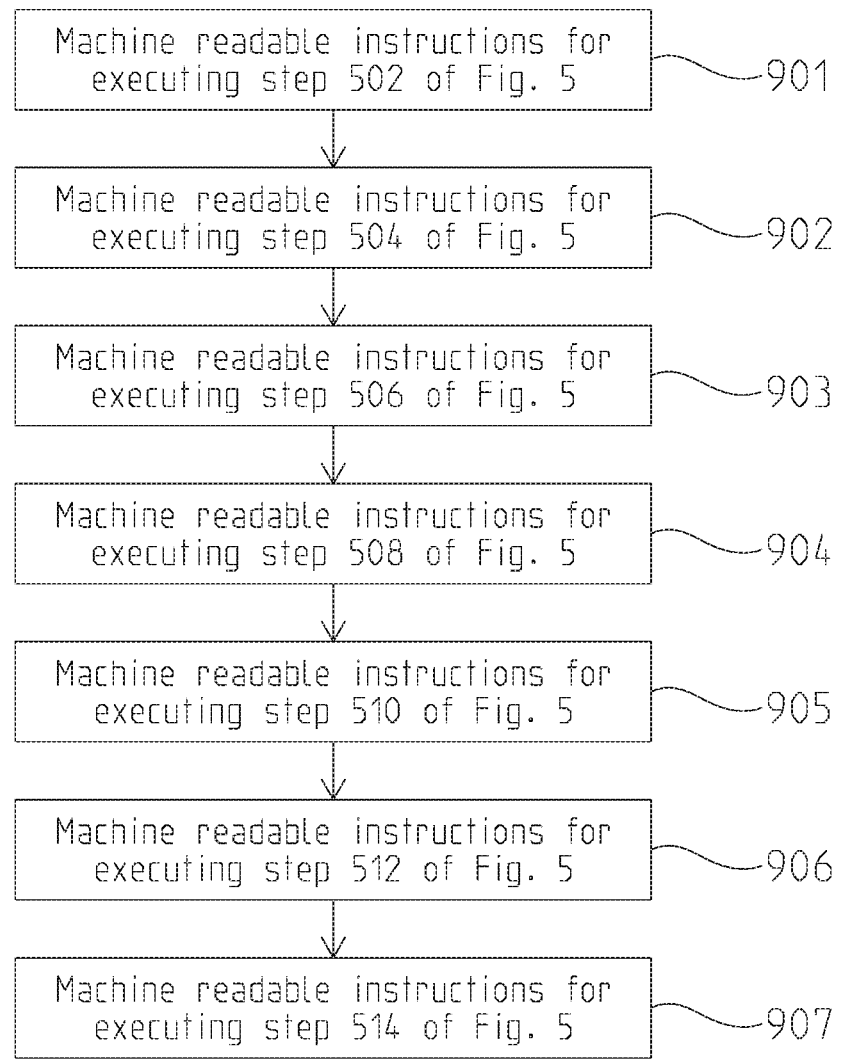
FIG. 9 shows a flowchart of a method according to another illustrative embodiment of the invention.

Referring to FIG. 9, a simplified block diagram showing code or subroutine blocks for executing an embodiment of the invention and operating various hardware elements (e.g., see FIGS. 2, 4, 6, and 7) that are stored on a recording medium (e.g., see FIG. 7, 715) storing a plurality of non-transitory machine readable instructions adapted for being read by and controlling a system comprising in accordance with an embodiment of the invention (e.g., see FIGS. 2, 4, 6, and 7), said instructions comprising: a first plurality of non-transitory machine readable instructions module 901 adapted for executing step 502 of FIGS. 5A and 5B, a second plurality of non-transitory machine readable instructions module 902 adapted for executing step 504 of FIGS. 5A and 5B, a third plurality of non-transitory machine readable instructions module 903 adapted for executing step 506 of FIGS. 5A and 5B, a fourth plurality of non-transitory machine readable instructions module 904 adapted for executing step 508 of FIGS. 5A and 5B, a fifth plurality of non-transitory machine readable instructions module 905 adapted for executing step 510 of FIGS. 5A and 5B, a sixth plurality of non-transitory machine readable instructions module 906 adapted for executing step 512 of FIGS. 5A and 5B, and a seventh plurality of non-transitory machine readable instructions module 907 adapted for executing step 514 of FIGS. 5A and 5B.

An alternative embodiment of the invention can include an embodiment that includes a system that applies waveform changes to pulse trains that can be either varying phase shifts or varying pulse widths. Such an exemplary embodiment can include software or control logic that enables a switch between multiple waveform changes applied to outbound (e.g., first pulse train transmitted after varying waveform changes applied) and inbound signals (e.g., inverse of the varying waveform changes applied to reflected and received first pulse train or first plurality of signals plus received coherent noise) based on predetermined criteria such as noise environment, types of other systems which are being interacted with (e.g., other vehicles have a varying phase shifts or varying pulse width systems or one type is preferred over another based on such predetermined criteria, etc). Another embodiment can apply more than one such waveform change to the same pulse train e.g. both varying phase shifts and varying pulse widths.

Although the invention has been described in detail with reference to certain preferred embodiments, variations and modifications exist within the spirit and scope of the invention as described and defined in the following claims.

The invention claimed is:

1. A platform or mobile system including system for coherent noise filtering, said system including:

an exciter, wherein said exciter generates a first electronic signal, wherein said first electronic signal includes a first plurality of pulses;

a controller, wherein said controller applies a first plurality of phase shifts comprising a varying phase shift to each of said first plurality of pulses in said first electronic signal such that each one of said first plurality of pulses receives a different phase shift as other said first plurality of pulses;

an antenna, wherein said antenna transmits said first electronic signal after said controller applies said first plurality of phase shifts comprising said varying phase shift to said first electronic signal, wherein said antenna is configured to receive said at least one coherent noise signal generated from a coherent noise source and said first electronic signal after said first electronic signal is reflected back to said antenna and received as a second electronic signal comprising a second plurality of pulses, wherein said coherent noise source interferes with said second electronic signal;

a receiver, wherein said receiver receives said second electronic signal and said coherent noise from said antenna, wherein said receiver interfaces with said controller to apply a second plurality of phase shifts comprising an inverse of each said first plurality phase shifts respectively to each pulse in said second electronic signal and said coherent noise, wherein said coherent noise becomes non-coherent to produce a filtered output upon application of said second plurality of phase shifts; and a Doppler processing and detection processing section that is configured to receive said filtered output, said Doppler processing and detection processing system is further configured to output detection data to a vehicle control signals section and an operator alert System Section based on said filtered output, wherein the vehicle control signals section outputs control data to a navigation system, an anti-lock brake system, a steering control system, or a safety restraints system associated with said system or platform, wherein the operator alert system is configured to generate another outputs to a system speaker comprising an audio warning or operator instruction as well as a user interface comprising a heads-up display based on said filtered output and said detection data.

2. The platform or system of claim 1, wherein said first electronic signal comprises a radar signal.

3. The platform or system of claim 1, wherein said varying phase shift is applied using a random number generator to calculate a pseudo-random phase shift for each of said first plurality of pulses.

4. The system or platform as in claim 1, wherein said controller comprises a field programmable gate array (FPGA) comprising programmable logic blocks configured to generate control signals for said exciter or transmitter used to modulate or generate said first plurality of pulses, wherein said controller further comprises a first phase shifter configured to control applying said phase shifts.

5. The system or platform as in claim 4, wherein said varying phase shift applied to each of said pulses in said first electronic signal are stored as varying phase shift data in said controller or FPGA, wherein said varying phase shift data are passed as control signals to said exciter or transmitter that then generates said first electronic signal through said antenna.

6. The system or platform as in claim 1, wherein said pulses comprises a radio frequency (RF), electromagnetic signal, or radar signal's pulses or continuous wave segments comprising a first plurality of wave shifted outputs.

7. A method for using coherent noise filtering, comprising:
providing a system for coherent noise filtering, said system including:
an exciter, wherein said exciter generates a first electronic signal, wherein said first electronic signal includes a first plurality of pulses;
a controller, wherein said controller applies a varying phase shift to each of said pulses in said first electronic signal such that each of said first plurality of pulses does not receive the same phase shift as all of the other said first plurality of pulses;
an antenna, wherein said antenna transmits said first electronic signal after said controller applies said varying phase shift to said first electronic signal, wherein said antenna is configured to receive said first electronic signal after said first electronic signal is reflected back to said antenna and received as a second electronic signal comprising a second plurality of pulses, wherein said antenna further receives said second electronic signal and at least one coherent noise generated from a coherent noise source that interferes with said second electronic signal; and
a receiver, wherein said receiver receives said second electronic signals and said coherent noise from said antenna, wherein said receiver interfaces with said controller to apply a phase shift to said second electronic signal and said coherent noise that is the opposite of said varying phase shift, wherein said coherent noise becomes non-coherent to produce a filtered output; and
a Doppler processing and detection processing section that is configured to receive said filtered output, said Doppler processing and detection processing system is further configured to output detection data to a vehicle control signals section and an operator alert System Section based on said filtered output, wherein the vehicle control signals section outputs control data to a navigation system, an anti-lock brake system, a steering control system, or a safety restraints system associated with said system or platform, wherein the operator alert system is configured to generate another outputs to a system speaker comprising an audio warning or operator instruction as well as a user interface comprising a heads-up display based on said filtered output and said detection data;
generating said first electronic signal using said exciter;
applying said varying phase shift using said controller to each of said pulses in said first electronic signal such that each of said pulses does not receive the same phase shift as all of the other said pulses;
transmitting said first electronic signal using said antenna after said varying phase shift is applied;
receiving said second electronic signal and said coherent noise using said antenna and said receiver;
applying a reverse phase shift to said second electronic signals, using said receiver interfacing with said controller, that is opposite of said varying phase shift such that said coherent noise becomes non-coherent to produce said filtered output; and
operating said Doppler processing and detection processing section that is configured to receive said filtered output, generating and outputting detection data from said Doppler processing and detection processing system and providing said detection data to said vehicle control signals section and an operator alert system section based on said filtered output, generating and outputting control data from said vehicle control signals section to said navigation system, said anti-lock brake system, said steering control system, or said safety restraints system associated with said system or platform, generating and outputting another output from said operator alert system to a system speaker comprising an audio warning or operator instruction as well as a user interface comprising a heads-up display based on said filtered output and said detection data.

8. The method of claim 7, wherein said first electronic signal comprises a radar signal.

9. The method of claim 7, wherein said controller is configured for generating and applying said varying phase shift by generating and applying a pseudo-random phase shift to each of said first plurality of pulses.

10. The method of claim 7, wherein said controller comprises a field programmable gate array (FPGA) comprising programmable logic blocks configured to generate control signals for said exciter used to modulate or generate said first plurality of pulses, wherein said controller further comprises a first phase shifter configured to control applying said phase shifts.

11. The method of claim 10, wherein said varying phase shift applied to each of said pulses in said first electronic signal are stored as varying phase shift data in said controller or FPGA, wherein said varying phase shift data are passed as control signals to said exciter or transmitter that then generates said first electronic signal through said antenna.

12. The method of claim 7, wherein said first and second electronic signal comprises a radio frequency (RF), electromagnetic signal, or radar signal's pulses or continuous wave segments to generate said first electronic signal.

13. A system for coherent noise filtering, said system including:
an exciter, wherein said exciter generates a first electronic signal, wherein said first electronic signal includes a first plurality of pulses, wherein each of said first plurality of pulses includes a leading edge and a midpoint;

a controller, wherein said controller applies a varying pulse width to each of said first plurality of pulses in said first electronic signal such that the time between said leading edge of each pulse varies and the time between said midpoint of each pulse is constant;

an antenna, wherein said antenna transmits said first electronic signal after said controller applies said varying pulse width, wherein said antenna is configured to receive said first electronic signal after said first electronic signal is reflected back to said antenna and received as second electronic signal comprising a second plurality of pulses, wherein said antenna is further configured to receive said second electronic signal and a coherent noise from at least one coherent noise source, wherein said coherent noise source generates coherent noise that interferes with said electronic signal;

a receiver, wherein said receiver receives said second electronic signal and said coherent noise from said antenna, wherein said receiver interfaces with said controller to align said midpoints of said second electronic signals' second plurality of pulses such that said coherent noise becomes non-coherent to produce a filtered output; and a Doppler processing and detection processing section that is configured to receive said filtered output, said Doppler processing and detection processing system is further configured to output detection data to a vehicle control signals section and an operator alert System Section based on said filtered output, wherein the vehicle control signals section outputs control data to a navigation system, an anti-lock brake system, a steering control system, or a safety restraints system associated with said system or platform, wherein the operator alert system is configured to generate another outputs to a system speaker comprising an audio warning or operator instruction as well as a user interface comprising a heads-up display based on said filtered output and said detection data.

14. The system of claim 13, wherein said electronic signal comprises a radar signal.

15. The system of claim 13, wherein said varying pulse width is applied to calculate a pseudo-random pulse width modulation for each of said pulses.

16. The system of claim 13, wherein said controller comprises a field programmable gate array (FPGA) comprising programmable logic blocks configured to generate control signals for said exciter used to modulate or generate said first plurality of pulses, wherein said controller further comprises a pulse width modulator configured to control applying said pulse width.

17. The system of claim 16, wherein said varying pulse width applied to each of said pulses in said first electronic signal are stored as varying pulse width data in said controller or FPGA, wherein said varying pulse width data are passed as control signals to said exciter or transmitter that then generates said first electronic signal through said antenna.

18. A method including coherent noise filtering, said method including:
providing a system for coherent noise filtering comprising:
an exciter, wherein said exciter generates a first electronic signal, wherein said first electronic signal includes a first plurality of pulses, wherein each of said first plurality of pulses includes a leading edge and a midpoint;

a controller, wherein said controller applies a varying pulse width modulation to each of said first plurality of pulses in said first electronic signal such that the time between said leading edge of each pulse varies and the time between said midpoint of each pulse is constant;

an antenna, wherein said antenna transmits said first electronic signal after said controller applies said varying pulse width, wherein antenna is configured to receive said first electronic signal after said first electronic signal is reflected back to said antenna and received as a second electronic signal comprising a second plurality of pulses, wherein said antenna is further configured to receive said second electronic signal and a coherent noise from at least one coherent noise source, wherein said coherent noise source generates coherent noise that interferes with said second electronic signal;

a receiver, wherein said receiver receives said second electronic signal and said coherent noise from said antenna, wherein said receiver interfaces with said controller to align said midpoints of said second electronic signals' second plurality of pulses such that said coherent noise becomes non-coherent to generate a filtered output; and a Doppler processing and detection processing section that is configured to receive said filtered output, said Doppler processing and detection processing system is further configured to output detection data to a vehicle control signals section and an operator alert System Section based on said filtered output, wherein the vehicle control signals section outputs control data to a navigation system, an anti-lock brake system, a steering control system, or a safety restraints system associated with said system or platform, wherein the operator alert system is configured to generate another outputs to a system speaker comprising an audio warning or operator instruction as well as a user interface comprising a heads-up display based on said filtered output and said detection data;

generating said first electronic signal using said exciter;

applying said varying pulse width using said controller to each of said first plurality of pulses in said first electronic signal such that the time between said leading edge of each pulse varies and the time between said midpoint of each pulse is constant;

transmitting said first electronic signal using said antenna after said varying pulse width is applied;

receiving said second electronic signals and said coherent noise using said antenna and said receiver;

aligning the midpoints of said second electronic signals' said second plurality of pulses using said receiver interfacing with said controller such that said coherent noise becomes non-coherent and generates said filtered output; and operating said Doppler processing and detection processing section that is configured to receive said filtered output, determining and generating detection data from said Doppler processing and detection processing system and providing said detection data to said vehicle control signals section and an operator alert system section based on said filtered output, generating and outputting control data from said vehicle control signals section to said navigation system, said anti-lock brake system, said steering control system, or said safety restraints system associated with said system or platform, generating and outputting another output from said operator alert system to a system speaker comprising an audio warning or operator instruction as well as a user interface comprising a heads-up display based on said filtered output and said detection data.

19. The method of claim 18, wherein said first electronic signal comprises a radar signal.

20. The method of claim 18, wherein said varying pulse width is applied to calculate a pseudo-random pulse width to each of said pulses.

21. The method of claim 18, wherein said controller comprises a field programmable gate array (FPGA) comprising programmable logic blocks configured to generate control signals for said exciter used to modulate or generate said first plurality of pulses, wherein said controller further comprises a pulse width modulator configured to control applying said pulse width.

22. The system of claim 21, wherein said varying pulse width applied to each of said pulses in said first electronic signal are stored as varying pulse width data in said controller or FPGA, wherein said varying pulse width data are passed as control signals to said exciter or transmitter that then generates said first electronic signal through said antenna.

23. A system for executing a coherent noise filtering system, comprising:
  an exciter;
  a controller;
  a signal processor;
  a phase shifter;
  an antenna;
  a receiver;
  a reverse phase shifter;
  a Doppler processing and detection processing section;
  a machine readable recording medium storing a plurality of non-transitory machine readable instructions;
  wherein said plurality of non-transitory machine readable instructions comprises:
    a first plurality of non-transitory machine readable instructions adapted to generate an initial pulsed signal using said exciter;
    a second plurality of non-transitory machine readable instructions adapted to apply a calculated phase shift using said phase shifter to the initial signal to create a resulting phase shifted radar signal;
    a third plurality of non-transitory machine readable instructions adapted to transmit said resulting phase shifted radar signal using said antenna;
    a fourth plurality of non-transitory machine readable instructions adapted to receive reflected resulting phase shifted radar signal and noise signals using said antenna, wherein said noise signals comprises coherent and/or non-coherent noise with respect to the reflected resulting phase shifted radar signal;
    a fifth plurality of non-transitory machine readable adapted to subtract the calculated phase shift, using said reverse phase shifter, from said reflected resulting phase shifted radar signal and said noise signals to create a modified resulting phase shifted radar signal and modified noise signals, causing coherent noise, if present, to become non-coherent with respect to said modified resulting phase shifted radar signal and thereby generating a first signal processing output;
    a sixth plurality of non-transitory machine readable instructions module adapted to, using said signal processor, generate a second signal processing output using a matched filter by passing said first signal processing output through said matched filter and extracting said modified resulting phase shifted radar signal from said modified noise signals by matching said modified resulting phase shifted radar signal with said initial pulsed signal and generating said second signal processing output;
    a seventh plurality of non-transitory machine readable instructions adapted to repeat said first, second, third, fourth, fifth, and sixth plurality of non-transitory machine readable instructions for all pulses in a pulse train wherein, using said controller, each of said calculated phase shifts is different than each other's calculated phase shift such that each initial pulsed signal's pulse or wave form within a coherent dwell receives varying phase shifts to create said resulting phase shifted radar signal for transmission of each said pulse in said pulse train and thereby generating a plurality of said second signal processing outputs; and
    an eighth plurality of non-transitory machine readable instructions adapted to, using said signal processor, perform Doppler processing on said plurality of said second signal processing outputs, determining or generating detection data for contacts of interest based on the Doppler processing of said second plurality of signal processing outputs, providing said detection data to a vehicle control system, and generating a user interface showing said detection data or controlling one or more vehicle components based on said detection data.

24. The system of claim 23, wherein said initial pulsed signal comprises a radar signal.

25. The system as in claim 23, wherein said controller comprises a field programmable gate array (FPGA) comprising programmable logic blocks configured to generate control signals for said exciter used to modulate or generate said initial pulsed signals, wherein said controller further comprises a first phase shifter configured to control applying said phase shifts.

26. The system or platform as in claim 25, wherein said calculated phase shift applied to each of said initial pulsed signal are stored as calculated phase shift data in said controller or FPGA, wherein phase shift data are passed as control signals to said exciter that then generates said resulting phase shifted radar signal through said antenna.

27. The system or platform as in claim 23, wherein said initial pulsed signals comprises a radio frequency (RF), electromagnetic signal, or radar signal's pulses or continuous wave segments to generate said initial pulsed signals.

28. A system for executing a coherent noise filtering system, comprising:
  an exciter;
  a controller;
  a signal processor;
  an antenna;
  a receiver;
  a Doppler processing and detection processing section;
  a machine readable recording medium storing a plurality of non-transitory machine readable instructions;
  wherein said plurality of non-transitory machine readable instructions comprises:
    a first plurality of non-transitory machine readable instructions adapted to generate a first pulsed signal using said exciter;
    a second plurality of non-transitory machine readable instructions adapted to a calculated pulse width and frequency modulated waveform and/or phase coded wave form, using said exciter and said controller, to said first pulsed signal to create a resulting varying pulse width radar signal;

a third plurality of non-transitory machine readable instructions adapted to transmit said resulting varying pulse width radar signal using said antenna;

a fourth plurality of non-transitory machine readable instructions adapted to receive reflected resulting varying pulse width radar signal and noise signals using said antenna, wherein said noise signals comprises coherent and/or non-coherent noise;

a fifth plurality of non-transitory machine readable adapted to, using said signal processor, perform compression and signal alignment processing on said first plurality of signals causing said coherent noise to become non-coherent with the reflected resulting varying pulse width radar signal by generating a second signal processing output using a matched filter by passing said first plurality of signals through said matched filter and extracting said reflected resulting varying pulse width radar signal by matching said reflected resulting varying pulse width radar signal with said resulting varying pulse width radar signal and generating said second signal processing output comprising a compressed and aligned reflected resulting pulse width modulated radar signal;

a sixth plurality adapted to repeat said first, second, third, fourth, fifth, and sixth plurality of non-transitory machine readable instructions for all pulses in a pulse train or duration of coherent dwell associated with each said resulting varying pulse width radar signal in said pulse train or said dwell wherein, using said controller, each of said calculated pulse widths and FM waveforms is different than previously calculated pulse widths and FM waveforms and/or phase coded wave form to the first signal such that each said resulting varying pulse width radar signal within the pulse train or said coherent dwell receives varying pulse width modulations to create the resulting pulse width modulated radar signals for transmission and thereby generating a plurality of said second signal processing outputs; and a seventh plurality of non-transitory machine readable instructions adapted to, using said signal processor, perform Doppler processing on said plurality of said second signal processing outputs, determining or generating detection data for contacts of interest based on the Doppler processing of said second plurality of signal processing outputs, providing said detection data to a vehicle control system, and generating a user interface showing said detection data or controlling one or more vehicle components based on said detection data.

29. The system of claim 28, wherein said first pulsed signal comprises a radar signal.

30. The system of claim 28, wherein said controller comprises a field programmable gate array (FPGA) comprising programmable logic blocks configured to generate control signals for said exciter used to modulate or generate said first pulsed signals, wherein said controller further comprises a varying pulse width configured to control applying said pulse width modulation.

31. The system of claim 30, wherein said varying pulse width applied to each of said pulses in said first pulsed signal are stored as varying pulse width data in said controller or FPGA, wherein said varying pulse width data are passed as control signals to said exciter that then generates said resulting varying pulse width radar signal through said antenna.

32. A platform or mobile system including system for coherent noise filtering, said system including:

an exciter, wherein said exciter generates a first electronic signal, wherein said first electronic signal includes a first plurality of pulses;

a controller, wherein said controller applies a first plurality of waveform changes comprising a varying phase shift or varying pulse width modulation to each of said first plurality of pulses in said first electronic signal such that each one of said first plurality of pulses receives a different phase shift or different pulse width as other said first plurality of pulses, wherein said waveform change comprises a pulse width based change each of said first plurality of pulses includes a leading edge and a midpoint, wherein said varying pulse width wave form changes applied to each of said first plurality of pulses in said first electronic signal are applied such that time between said leading edge of each pulse varies and the time between said midpoint of each pulse is constant;

an antenna, wherein said antenna transmits said first electronic signal after said controller applies said first plurality of waveform changes to said first electronic signal, wherein said antenna is configured to receive said at least one coherent noise signal generated from a coherent noise source and said first electronic signal after said first electronic signal is reflected back to said antenna and received as a second electronic signal comprising a second plurality of pulses, wherein said coherent noise source interferes with said second electronic signal;

a receiver, wherein said receiver receives said second electronic signal and said coherent noise from said antenna, wherein said receiver interfaces with said controller to apply a second plurality of waveform changes comprising either a plurality of pulse width alignments or a plurality of phase based waveform changes, wherein for said plurality of pulse width alignments said receiver interfaces with said controller to align said midpoints of said second electronic signals' second plurality of pulses such that said coherent noise becomes non-coherent to produce a first filtered output, wherein for said phase based waveform changes said receiver interfaces with said controller to apply an inverse of each said first plurality phase shifts respectively to each pulse in said second electronic signal and said coherent noise wherein said coherent noise becomes non-coherent to produce a second filtered output upon application of said second plurality of phase shifts; and a Doppler processing and detection processing section that is configured to receive said first or second filtered output, said Doppler processing and detection processing system is further configured to output detection data to a vehicle control signals section and an operator alert System Section based on said first or second filtered output, wherein the vehicle control signals section outputs control data to a navigation system, an antilock brake system, a steering control system, or a safety restraints system associated with said system or platform, wherein the operator alert system is configured to generate another outputs to a system speaker comprising an audio warning or operator instruction as well as a user interface comprising a heads-up display based on said first or second filtered output and said detection data.

33. The platform or system of claim 32, wherein said first electronic signal comprises a radar signal.

34. The platform or system of claim 32, wherein said varying phase shift is applied using a random number generator to calculate a pseudo-random phase shift for each of said first plurality of pulses.

35. The system or platform as in claim 32, wherein said controller comprises a field programmable gate array (FPGA) comprising programmable logic blocks configured to generate control signals for said exciter or transmitter used to modulate or generate said first plurality of pulses, wherein said controller further comprises a first phase shifter configured to control applying said phase shifts.

36. The system or platform as in claim 35, wherein said varying phase shift applied to each of said pulses in said first electronic signal are stored as varying phase shift data in said controller or FPGA, wherein said varying phase shift data are passed as control signals to said exciter or transmitter that then generates said first electronic signal through said antenna.

37. The system or platform as in claim 35, wherein said pulses comprises a radio frequency (RF), electromagnetic signal, or radar signal's pulses or continuous wave segments comprising a first plurality of wave shifted outputs.

38. The system of claim 32, wherein when said varying pulse width is applied to calculate a pseudo-random pulse width modulation for each of said pulses.

39. The system of claim 32, wherein said controller further comprises a field programmable gate array (FPGA) comprising programmable logic blocks configured to generate control signals for said exciter used to modulate or generate said first plurality of pulses, wherein said controller further comprises a pulse width modulator configured to control applying said varying pulse width.

40. The system of claim 39, wherein said varying pulse width applied to each of said pulses in said first electronic signal are stored as a varying pulse width data in said controller or FPGA, wherein said varying pulse width data are passed as control signals to said exciter or transmitter that then generates said first electronic signal through said antenna.

41. A method for using coherent noise filtering, comprising:
providing a system for coherent noise filtering, said system including:
an exciter, wherein said exciter generates a first electronic signal, wherein said first electronic signal includes a first plurality of pulses;
a controller, wherein said controller applies a first plurality of waveform changes comprising a varying phase shift or varying pulse width to each of said first plurality of pulses in said first electronic signal such that each one of said first plurality of pulses receives a different phase shift or different pulse width as other said first plurality of pulses, wherein where said waveform change comprises a pulse width based change each of said first plurality of pulses includes a leading edge and a midpoint, wherein said varying pulse width wave form changes applied to each of said first plurality of pulses in said first electronic signal are applied such that time between said leading edge of each pulse varies and the time between said midpoint of each pulse is constant;

an antenna, wherein said antenna transmits said first electronic signal after said controller applies said first plurality of waveform changes to said first electronic signal, wherein said antenna is configured to receive said at least one coherent noise signal generated from a coherent noise source and said first electronic signal after said first electronic signal is reflected back to said antenna and received as a second electronic signal comprising a second plurality of pulses, wherein said coherent noise source interferes with said second electronic signal;

a receiver, wherein said receiver receives said second electronic signal and said coherent noise from said antenna, wherein said receiver interfaces with said controller to apply a second plurality of waveform changes comprising either a plurality of pulse width alignments or a plurality of phase based waveform changes, wherein for said plurality of pulse width alignments said receiver interfaces with said controller to align said midpoints of said second electronic signals' second plurality of pulses such that said coherent noise becomes non-coherent to produce a first filtered output, wherein for said phase based waveform changes said receiver interfaces with said controller to apply an inverse of each said first plurality phase shifts respectively to each pulse in said second electronic signal and said coherent noise wherein said coherent noise becomes non-coherent to produce a second filtered output upon application of said second plurality of phase shifts; and a Doppler processing and detection processing section that is configured to receive said first or second filtered output, said Doppler processing and detection processing system is further configured to output detection data to a vehicle control signals section and an operator alert System Section based on said first or second filtered output, wherein the vehicle control signals section outputs control data to a navigation system, an anti-lock brake system, a steering control system, or a safety restraints system associated with said system or platform, wherein the operator alert system is configured to generate another outputs to a system speaker comprising an audio warning or operator instruction as well as a user interface comprising a heads-up display based on said first or second filtered output and said detection data;

generating said first electronic signal using said exciter;
applying said first plurality of waveform changes using said controller to each of said pulses in said first electronic signal;
transmitting said first electronic signal using said antenna after said first plurality of waveform changes are applied;
receiving said second electronic signal and said coherent noise using said antenna and said receiver;
applying said second plurality of waveform changes to said second electronic signals, using said receiver interfacing with said controller such that said coherent noise becomes non-coherent to produce said first or second filtered output; and
operating said Doppler processing and detection processing section that is configured to receive said first or second filtered output, generating and outputting detection data from said Doppler processing and detection processing system and providing said detection data to said vehicle control signals section and an operator alert system section based on said first or second filtered output, generating and outputting control data from said vehicle control signals section to said navigation system, said anti-lock brake system, said steering control system, or said safety restraints system associated with said system or platform, generating and outputting another output from said operator alert system to a system speaker comprising an audio warning or operator instruction as well as a user interface comprising a heads-up display based on said filtered output and said detection data.

42. The method of claim 41, wherein said first electronic signal comprises a radar signal.

43. The method of claim 41, wherein said controller is configured for generating and applying said varying phase shift by generating and applying a pseudo-random phase shift to each of said first plurality of pulses.

44. The method of claim 41, wherein said controller comprises a field programmable gate array (FPGA) comprising programmable logic blocks configured to generate control signals for said exciter used to modulate or generate said first plurality of pulses, wherein said controller further comprises a first phase shifter configured to control applying said phase shifts.

45. The method of claim 44, wherein said varying phase shift applied to each of said pulses in said first electronic signal are stored as varying phase shift data in said controller or FPGA, wherein said varying phase shift data are passed as control signals to said exciter or transmitter that then generates said first electronic signal through said antenna.

46. The method of claim 41, wherein said first and second electronic signal comprises a radio frequency (RF), electromagnetic signal, or radar signal's pulses or continuous wave segments to generate said first electronic signal.

47. The method of claim 41, wherein when said varying pulse width is applied it calculates a pseudo-random pulse width modulation to each of said pulses.

48. The method of claim 41, wherein said controller further comprises a field programmable gate array (FPGA) comprising programmable logic blocks configured to generate control signals for said exciter used to modulate or generate said first plurality of pulses, wherein said controller further comprises a pulse width modulator configured to control applying said varying pulse width.

49. The system of claim 48, wherein where said varying pulse width is applied to each of said pulses in said first electronic signal are stored as varying pulse width data in said controller or FPGA, wherein said varying pulse width data are passed as control signals to said exciter or transmitter that then generates said first electronic signal through said antenna.

* * * * *